Dec. 30, 1969    J. G. BERGSTRÖM ET AL    3,486,420
CYLINDER CONTAINING A PISTON HAVING A GROOVE
CONTAINING A PISTON RING

Filed Sept. 7, 1967    4 Sheets-Sheet 1

INVENTORS
Johan Gunnar Bergström
Hans Nils Bergsten

BY Pierce, Scheffler & Parker
ATTORNEYS

Dec. 30, 1969   J. G. BERGSTRÖM ET AL   3,486,420
CYLINDER CONTAINING A PISTON HAVING A GROOVE
CONTAINING A PISTON RING
Filed Sept. 7, 1967    4 Sheets-Sheet 2

INVENTORS
Johan Gunnar Bergström
Hans Nils Bergsten

BY Pierce, Scheffler & Parker
ATTORNEYS

Dec. 30, 1969   J. G. BERGSTRÖM ET AL   3,486,420
CYLINDER CONTAINING A PISTON HAVING A GROOVE
CONTAINING A PISTON RING
Filed Sept. 7, 1967                     4 Sheets-Sheet 4

INVENTORS
Johan Gunnar Bergström
Hans Nils Bergsten

BY Pierce, Scheffler & Parker
ATTORNEYS

United States Patent Office 3,486,420
Patented Dec. 30, 1969

3,486,420
CYLINDER CONTAINING A PISTON HAVING A GROOVE CONTAINING A PISTON RING
Johan Gunnar Bergström, Farsta, and Hans Nils Bergsten, Vallingby, Sweden, assignors to Aktiebolaget Atomenergi, Stockholm, Sweden, a company of Sweden
Filed Sept. 7, 1967, Ser. No. 666,174
Claims priority, application Sweden, Sept. 8, 1966, 12,122/66
Int. Cl. F16j 9/00
U.S. Cl. 92—200　　　　　　　　　　　　2 Claims

ABSTRACT OF THE DISCLOSURE

If a piston operates in a fluid containing solid particles, such particles may deposit in the groove for the piston ring, thus obstructing the movements of the piston ring. According to the invention the piston ring groove is provided with openings through which deposited solid particles may leave the groove.

---

The invention is concerned with a cylinder containing a piston having a groove containing a piston ring. It is the main object of the invention to provide piston ring means which are superior to conventional piston ring means when operating in a gas or liquid which contains solid particles, particularly during conditions prohibiting the use of soft piston rings, for instance of plastics or rubber such as high temperature conditions or in a radioactive environment. The invention is primarily concerned with a piston moving slowly in a cylinder, or being at rest for long periods, for instance a piston in a fuel element tube in a nuclear reactor or a piston in a controlling or regulating apparatus, but the invention is also useful for a piston moving at a high speed, such as in a piston pump or piston engine.

If a piston ring of metal or similar hard material is provided in a groove in a piston, solid particles in the operating fluid will collect in the groove. A sufficient amount of solid particles having been collected, they will obstruct the normal movement of the piston ring in the groove. In this way the piston ring is made inoperable, and the machine does not work satisfactorily.

It is the object of the invention to provide means reducing or eliminating the harmful effect of the solid particles on the piston ring. According to the invention this object is achieved by the piston ring groove being substantially open inwardly by means of an opening communicating with the cylinder, for preventing solid particles from depositing in the groove, thus clogging the groove.

Figure 1:
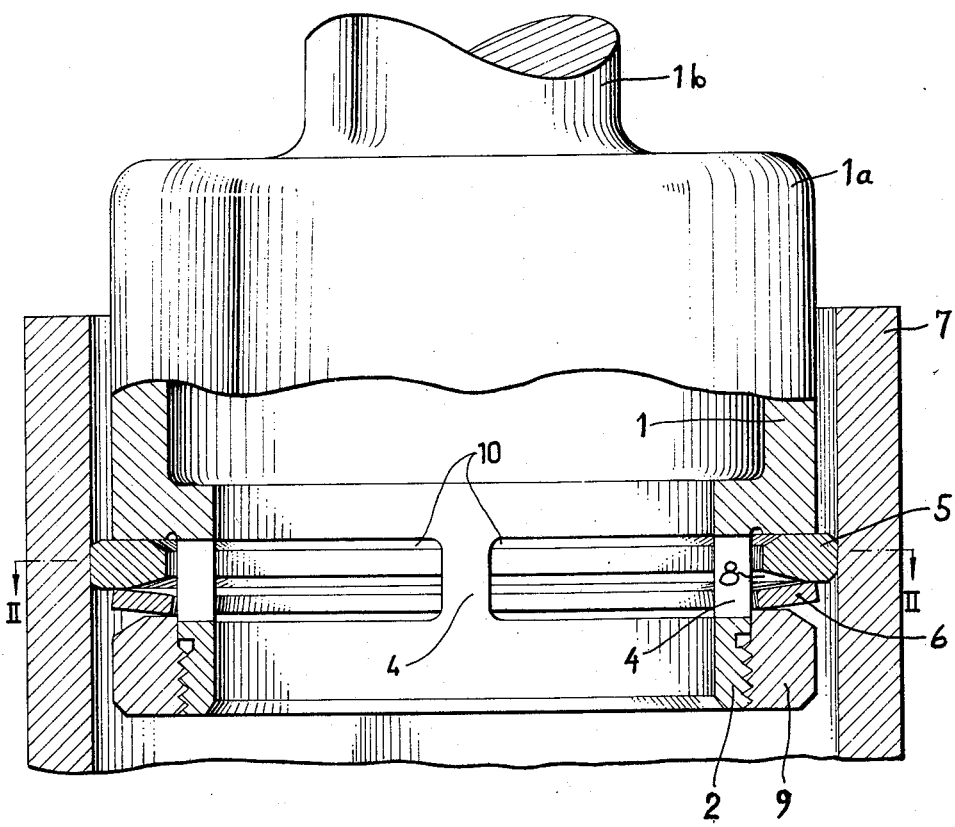
Figure 2:
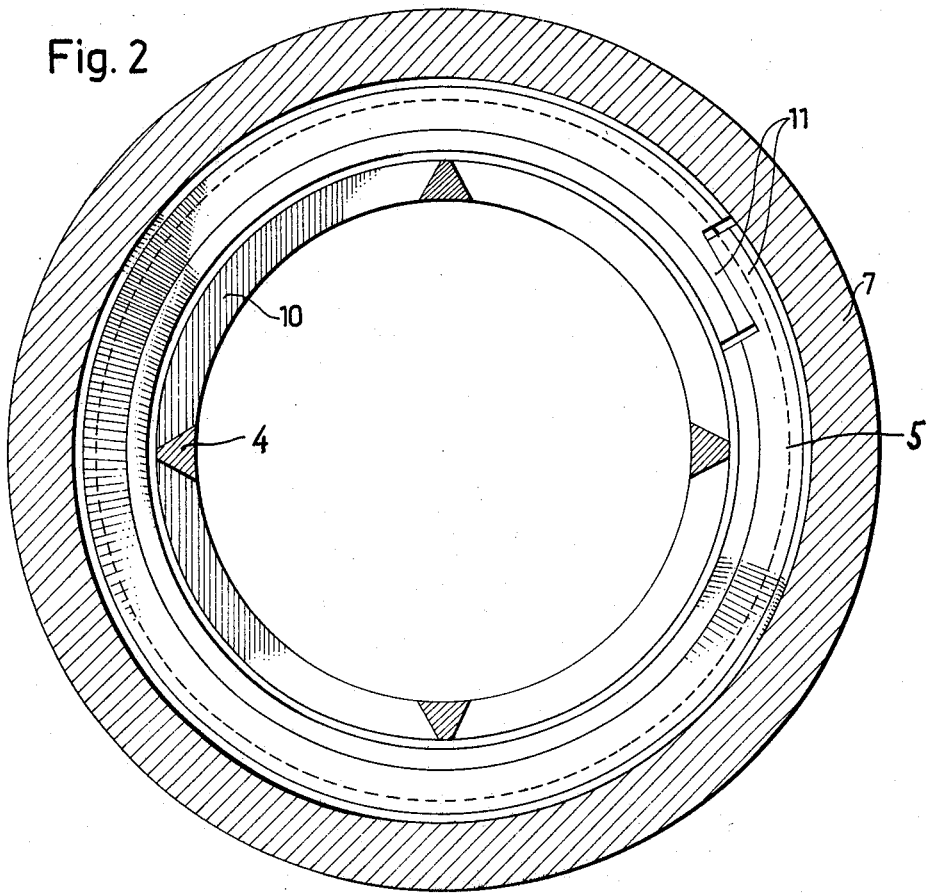
Figure 3:
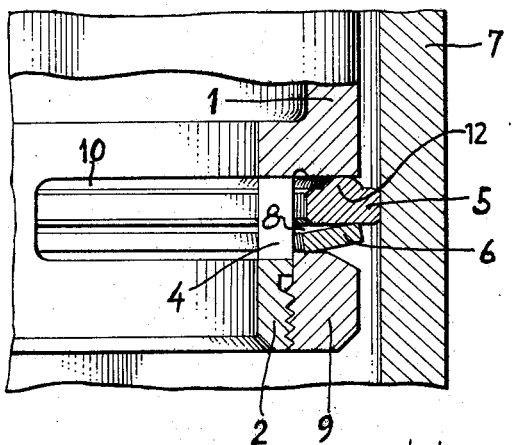
Figure 4:
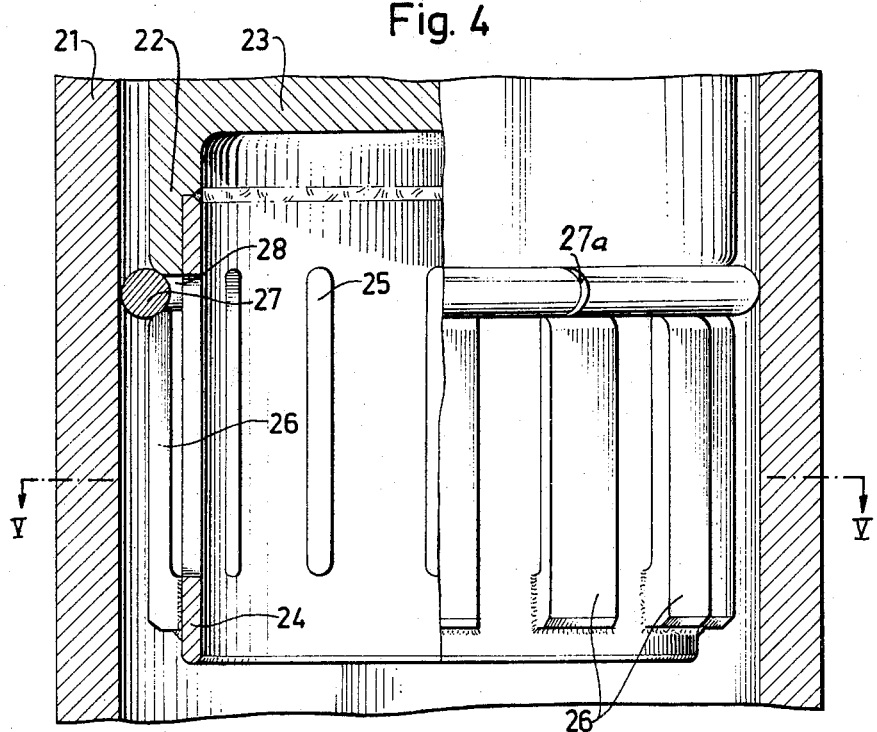
Figure 5:
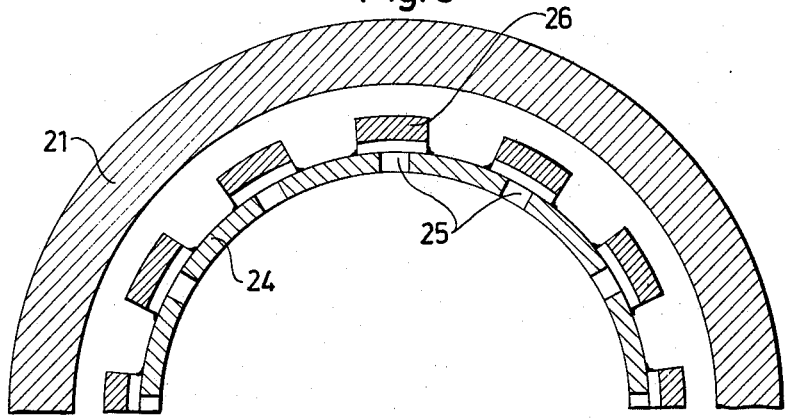
Figure 7:
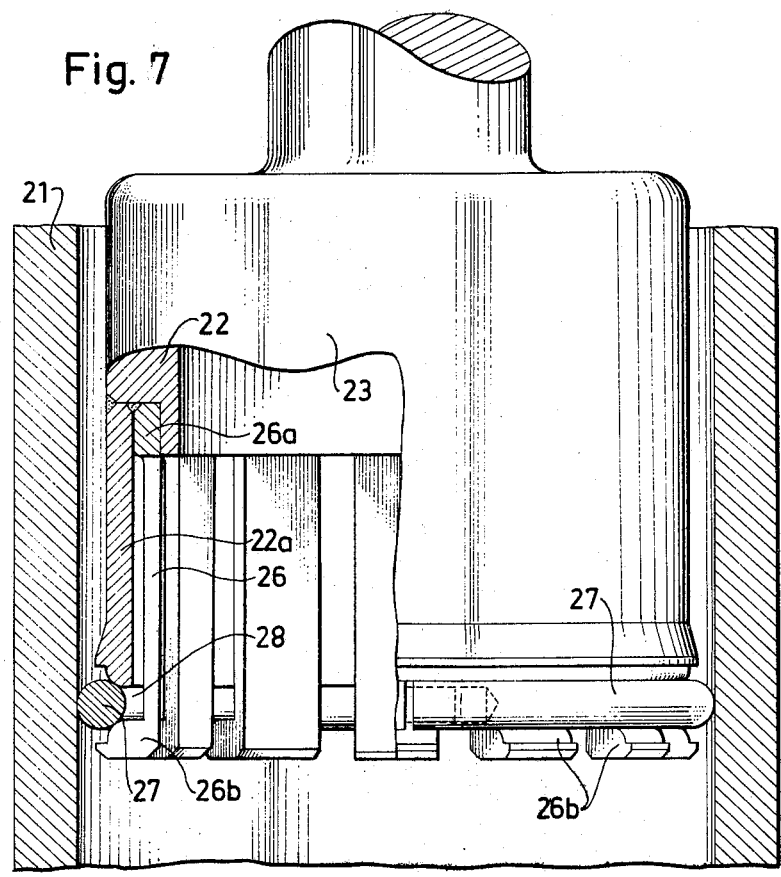
Figure 6:
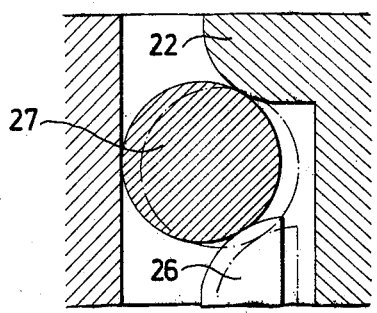

The invention will now be explained with reference to the accompanying drawings. FIG. 1 illustrates one embodiment of the invention. FIG. 2 illustrates a section along the line II—II in FIG. 1. FIG. 3 illustrates a modification of the device illustrated in FIG. 1. FIG. 4 illustrates a second embodiment of the invention. FIG. 5 illustrates a section along the line V—V in FIG. 4. FIG. 6 illustrates on a larger scale a portion of the device illustrated in FIG. 4. FIG. 7 illustrates a third embodiment of the invention.

FIG. 1 illustrates a cylinder 7 containing a piston having a side wall 1 and a top wall 1a fastened to a piston rod 1b. The lower portion 2 of the piston wall has a reduced diameter. A lock ring 9 is fastened to this lower portion 2 by means of a screw thread. The lock ring and the upper portion of the piston wall define an annular groove 8 for a piston ring. The lower portion 2 of the piston wall contains four openings 10, each opening extending over nearly one fourth of the circumference. Consequently, the lower portion 2 of the piston wall will form an annular portion being connected to the main body of the piston by four narrow members 4 only.

The groove 8 contains a piston ring 5 consisting of metal or another hard material. The piston ring is cut open to form overlapping ends 11, thus making the ring resilient in the radial direction. The groove 8 also contains a spring washer 6 urging the piston ring 5 upwardly i.e. in a direction axially of the piston with a force that can be regulated by means of the lock ring 9. The sealing between the piston ring and the piston is produced by the spring action of the spring washer, whereas the sealing between the piston ring and the cylinder wall is produced by the spring action of the piston ring.

In operation the piston ring 5 will be subjected to lateral movements relative to the piston 1, for instance due to vibrations or heat expansion. These movements are not obstructed by the solid particles in the operating fluid, due to the fact that the groove 8 is inwardly open through the openings 10, resulting in that the solid particles do not collect in the groove 8 behind the piston ring 5. This results in a good sealing action between the piston ring on the one hand, and the piston and the cylinder on the other hand. A minor leakage results through the cut-open portion of the piston ring.

The embodiment disclosed in FIG. 3 is a modification of that of FIG. 1, and the same reference characters have been used for similar parts. The upper side of the piston ring 5 is provided with a ridge-like portion 12 which is in contact with the upper surface of the groove 8. The ridge-like portion permits a higher pressure per unit area between the piston ring and the piston than is the case in the device of FIG. 1, provided that the spring washer 6 is prestressed to the same degree. If desired, a similar ridge-like portion can be provided on the surface of the piston ring which is in sealing engagement with the cylinder wall. These ridge-like portions permit a better movement of the piston ring on the surfaces contacting the piston ring, particularly if said surfaces are somewhat rough, for instance a roughness produced by deposited matter or defects in the manufacture.

FIG. 4 illustrates a cylinder 21 containing a piston having a side wall 22 and a top wall 23 connected to a piston rod, not illustrated. The side wall 22 has an extended portion, consisting of a tubular member 24 of a reduced diameter, fastened by welding to the wall 22. The tubular member 24 contains a plurality of elongated openings 25. A plurality of elongated resilient members 26 are fastened by welding to the lower portion of the tubular member 24, extending upwardly from the zone of welding. Each elongated resilient member 26 is situated close to an elongated opening 25. The upper ends of the resilient members are rounded, and said upper rounded ends and the rounded lower edge of the wall 22 defined a groove 28 for a piston ring 27. The piston ring has a circular cross-section, and it is cut open (at 27a) to allow a radial movement. The diameter of the piston ring 27 is somewhat larger than the width of the groove 28. Consequently, the piston ring will be in contact with the wall of the cylinder 21 and with the rounded ends of the resilient members 26 and the wall 22.

The resilient members 26 allow a radial movement of the piston ring 27. FIG. 6 illustrates on a larger scale how the piston ring changes its position when it is pressed inwardly. The resilient member 26 moves inwardly to reach the position indicated in dotted lines, and the piston ring 27 moves inwardly and somewhat downwardly.

In operation an obstruction of the groove 28 by solid particles is prevented by the fact that there is a communication between the groove and the cylinder, viz.

through the openings 25 and through the spaces between the resilient members 26. Solid particles depositing between the members 26 and the tubular member 24 leave the piston through the elonagted openings 25.

The embodiment disclosed in FIG. 7 is a modification of that of FIG. 4, and the same reference characters have been used for similar parts. In the embodiment of FIG. 7 the resilient members 26 have been produced by cutting slots in a tubular member 26a which is fastened by welding to the piston wall 22. A tubular member 22a is also fastened by welding to the piston wall 22, to surround the resilient members 26. The lower end of the tubular member 22a and thickened portions 26b on the lower ends of the resilient members 26 define a groove 28 for a piston ring 27. The groove 28 communicates with the cylinder through the spaces between the thickened portions 26b.

What is claimed is:

1. A piston and ring assembly comprising a hollow piston, the wall of said piston at the hollow portion thereof being provided with a peripherally extending groove, a piston ring seated in said groove, said groove extending radially through the entire thickness of the piston wall at circumferentially spaced loactions thereby developing corresponding passageways communicating between the base of the groove and the interior of the piston and hence the cylinder in which said piston is intended to operate thereby to prevent solid foreign particles from accumulating in and clogging said groove, and spring means located in contact with and urging said piston ring in a direction axially of said piston to engage a side wall of said groove.

2. A piston and ring assembly as defined in claim 1 wherein said piston is constituted by a main body portion and an annular threaded end portion adjoining said main body portion, wherein said spring means is constituted by an annular spring washer, and which further includes a threaded locking ring screwed onto said threaded end portion to engage and urge said piston ring into contact with one side wall of said groove, said threaded locking ring also constituting the opposite side wall of said groove.

References Cited

UNITED STATES PATENTS

| 1,605,810 | 11/1926 | Cormier | 92—193 |
| 1,933,943 | 11/1933 | Towell | 92—193 |
| 2,610,098 | 9/1952 | Reiners | 92—182 |
| 3,335,643 | 8/1967 | Wentworth | 92—182 |
| 2,074,282 | 3/1937 | Spengler | 92—235 |
| 2,787,504 | 4/1957 | Jardine et al. | 92—235 |
| 2,829,017 | 4/1958 | Turlay | 92—235 X |

CARROLL B. DORITY, Jr., Primary Examiner

U.S. Cl. X.R.

92—235